Sept. 5, 1961  F. O. WORDEN  2,998,803
CATTLE OILER
Filed Nov. 10, 1958  2 Sheets-Sheet 1
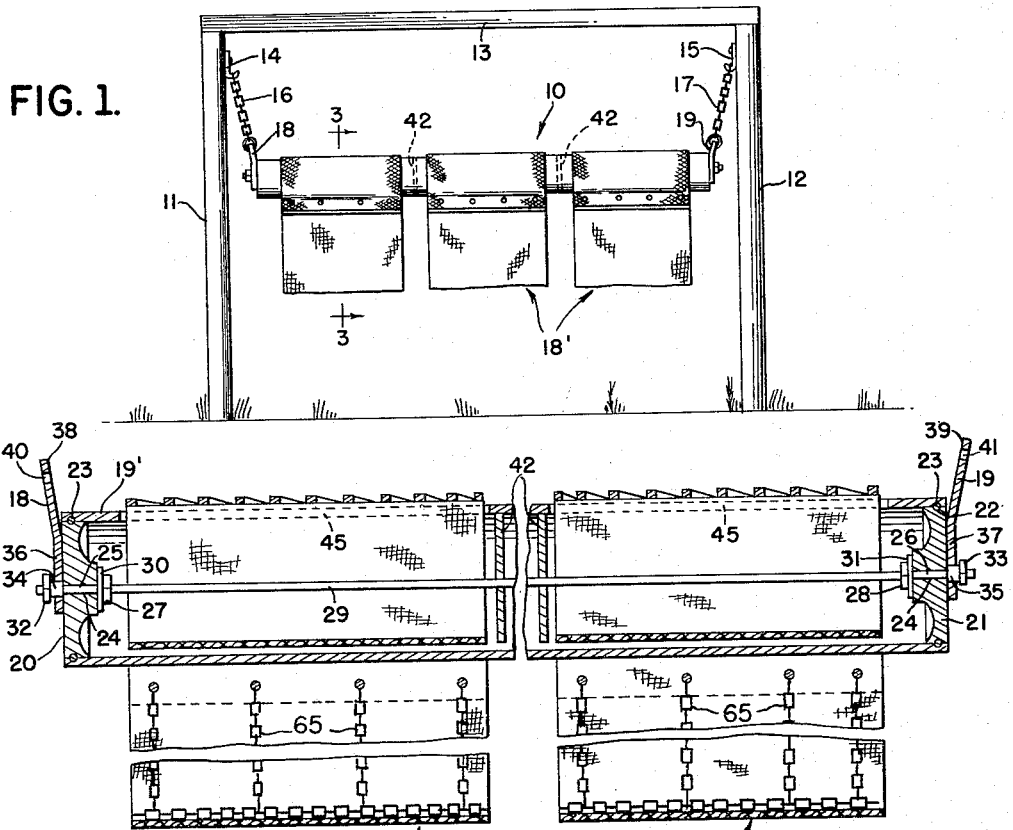
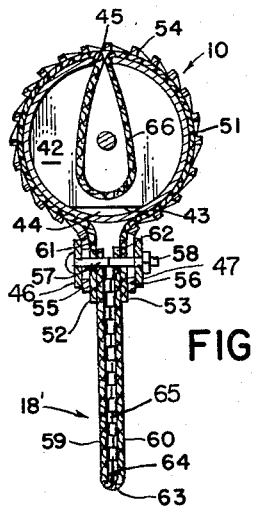
FIG. 3.
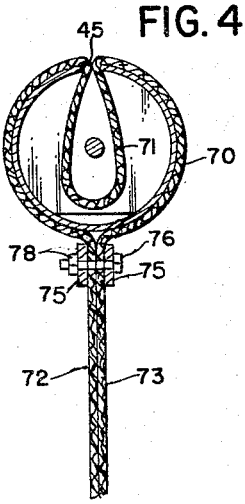
FIG. 4.
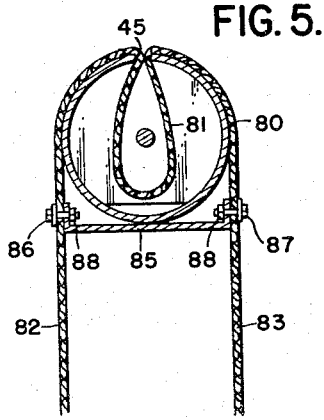
FIG. 5.
*INVENTOR.*
FLOYD O. WORDEN
BY
ATTORNEYS Sept. 5, 1961     F. O. WORDEN     2,998,803
CATTLE OILER
Filed Nov. 10, 1958     2 Sheets-Sheet 2
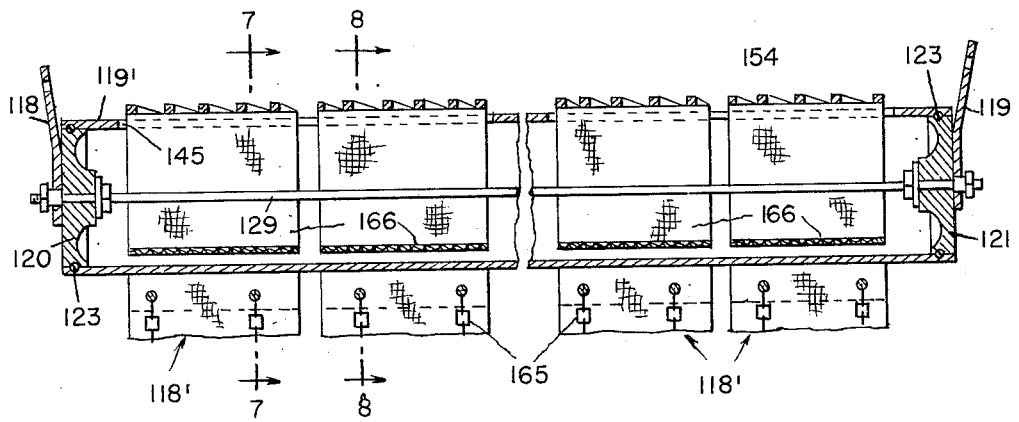
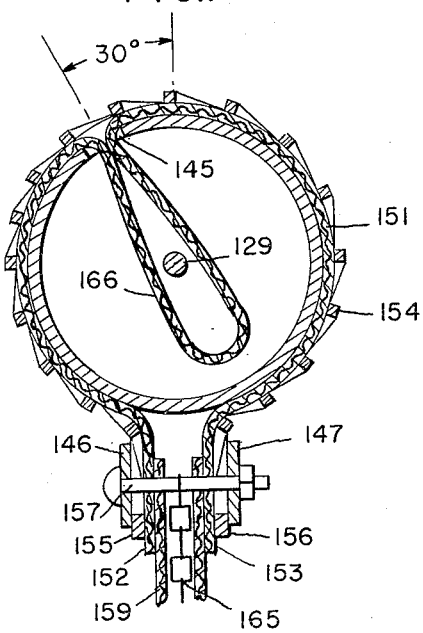 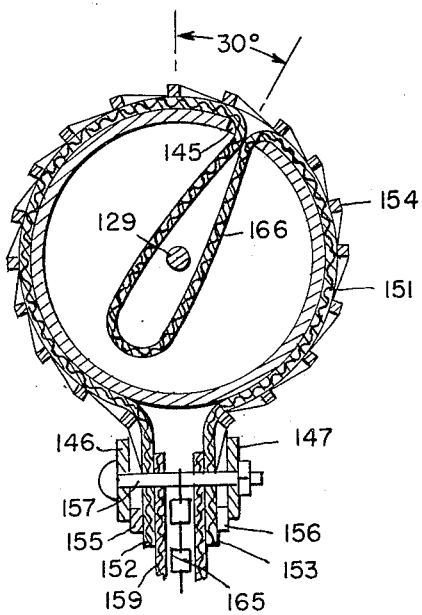
INVENTOR
Floyd O. Worden
BY
Shoemaker & Mattare
ATTORNEYS

2,998,803
CATTLE OILER
Floyd O. Worden, 115 E. 18th St., Grand Island, Nebr.
Filed Nov. 10, 1958, Ser. No. 772,867
23 Claims. (Cl. 119—157)

The present invention relates to a cattle oiler, and more particularly to an oiler for dispensing liquid chemicals and the like directly upon the skin of livestock.

The control of grub, insects and lice of the like is an ever present problem with various types of livestock, particularly cattle and hogs. These types of insects cause considerable damage to such livestock and accordingly various methods have been developed for combating the insects, the most effective of which has proved to be the application of chemicals in liquid form. This is ordinarily accomplished by spraying the livestock with the liquid chemical.

It is, of course, a very expensive and time consuming operation to periodically herd the cattle into position where they may be effectively sprayed, and accordingly it is very desirable to provide a mechanism with which the animals themselves can automatically provide the proper chemical application.

The present invention provides a structure which is suspended in various locations about the fields in which the animals are located, and is so designed such that it provides the rubbing and scratching effect which cattle, in particular, desire whereby the cattle will, of their own volition, walk beneath the apparatus and cause the wiping portions thereof to travel across their backs.

The invention apparatus is so designed as to have depending absorbent flap portions which engage the skin of the animals thereby applying the insecticide over the head, entire back and sides of the animal. The body heat of the animal, gravity and precipitation cause the liquid chemical to work down over the entire body of the animal, thereby providing a very effective saturation of the insecticide. In this manner, the treatment of dairy cattle entirely eliminates the necessity of spraying thereby substantially reducing the labor and cost involved.

In the construction according to the present invention, an elongated closed hollow substantially cylindrical body means is provided having closure means at opposite ends thereof. The body means is rotatably supported by suitable flexible members such as link chains such that the body means is adapted to tilt and rotate as the animals walk therebeneath in order to periodically allow treating fluid within the body means to pass outwardly therefrom through suitable longitudinally extending openings provided in the body means which are normally disposed uppermost.

Baffles may be provided within the body means for preventing sloshing and turbulence of the fluid therein as the body means moves under the influence of the animals. Absorbent layers of material are disposed about the body means and include downwardly extending portions which either directly engage the animals or are connected to additional absorbent means which is adapted to engage the skin of the animal.

Intermediate portions of the absorbent layers project through the openings provided in the body means and are looped within the interior of the body means such that this intermediate portion of the absorbent layers controls the flow of fluid out through the openings in the body means, and in addition provides a very effective wick means which tends to maintain the absorbent material saturated with liquid chemical at all times.

The lower end portions of each of the layers, according to the present invention, extend down below the lower portion of the body means and are maintained in spaced relationship by suitable connector means which serves to maintain the absorbent layers in proper operative position relative to the body means.

An object of the present invention is the provision of a new and novel cattle oiler which is particularly suited for applying liquid chemical to the hide or skin of livestock in the fields at points located adjacent the feeding grounds such that the livestock have free access to the oil.

Another object of the present invention is to provide a cattle oiler which is suspended in proper position to engage the skins of the cattle and wherein the depending wiping means will be maintained in saturated condition at all times.

Yet another object of the invention is to provide a cattle oiler which is very simple and inexpensive in construction, yet which is efficient and reliable in operation.

Other objects and many attendant advantages of the invention will become more apparent when considered in connection with the accompanying specification and drawing wherein:

FIG. 1 is an elevational view illustrating one form of the invention disposed in normal operative position for engaging cattle walking thereunder;

FIG. 2 is a longitudinal vertical section of the oiler assembly shown in FIG. 1;

FIG. 3 is an enlarged sectional view taken along line 3—3 of FIG. 1 looking in the direction of the arrows;

FIG. 4 is a view similar to FIG. 3 illustrating a modification of the invention;

FIG. 5 is a view similar to FIG. 3 illustrating yet another modification according to the present invention;

FIG. 6 is a view similar to FIG. 2 illustrating a further modification according to the present invention;

FIG. 7 is a sectional view taken on line 7—7 of FIG. 6 looking in the direction of the arrows; and FIG. 8 is a sectional view taken on line 8—8 of FIG. 6 looking in the direction of the arrows.

Referring now to the drawing wherein like reference characters designate corresponding parts throughout the several views, there is shown in FIG. 1 an oiler assembly indicated generally by reference numeral 10 which is suspended at a fixed elevation above the ground by a supporting framework including uprights 11 and 12 and a cross bar 13 which interconnects the upper ends of the uprights. Of course, the supporting framework may take any desired form and a specific structure shown in FIG. 1 is intended to be illustrative only.

The supporting uprights 11 and 12 are provided with hook members 14 and 15 upon which are engaged chain members 16 and 17 which are in turn provided at their lower ends with the mounting bracket members 18 and 19 more fully described hereinafter. Suffice it at this point to say that the chains 16 and 17 or like flexible elements rotatably support the oiler assembly 10 is suspended relation from the uprights 11 and 12 and in properly spaced relation above the ground so that when livestock such as cattle pass therebeneath the outer surface of the oiler will contact the back of the livestock with the absorbent means, which is indicated generally by the reference character 18′, draped upon and engaging their skin or hide and such that the movement of the livestock will cause a partial rotation of the oiler assembly 10 to effect an automatic dispensation of liquid chemical therefrom which in turn will constantly maintain the absorbent means 18′ in moist condition so that some liquid chemical will be applied to the hides of the livestock as they pass therebeneath and in contact with the absorbent means 18′. The interconnection between flexible chain members 16 and 17 either at hook members 14 and 15 or at mounting bracket members 18 and 19 may also be a swivel connection in order to permit substantially universal movement of the oiler mechanism with respect to the supporting uprights.

Referring now more particularly to FIGS. 2 and 3, it will be seen that the oiler assembly 10 consists essentially of an elongate cylindrical or tubular body 19' which is closed at its opposite ends by the disc members 20 and 21 each of which is provided with an annular groove 22 within which is fitted an O-ring 23 of rubber or similar material. The circumference of the discs 20 and 21 is such that the discs are snugly fitted within the ends of the cylindrical body 10 and such that the O-rings 23 are deformed by engagement with the inner surface of the body 19' and thereby effect a sealing engagement therewith to prevent loss of liquid.

Each disc 20 and 21 is provided with a central bore 24 and the shanks of the bolts 25 and 26 are passed therethrough with the heads 27 and 28 of such bolts disposed on inner sides of the discs, these bolt heads being interconnected by the elongate rod 29 which extends therebetween and is connected thereto. Preferably, washers 30 and 31 are disposed between the bolt heads 27 and 28 and the adjacent inner surfaces of the discs 20 and 21. The bolts 25 and 26 are of such length as to extend outwardly of the disc members 20 and 21 and they have received thereon the nut members 32 and 33 which bear against bushing members 34 and 35, the bushings 34 and 35 being disposed between such nut members and the outer faces of the discs 20 and 21.

The mounting bracket members 18 and 19 for suspending the oiler from the chains 16 and 17 have substantially vertical lower end portions 36 and 37 which are apertured to loosely receive their respective bushing members 34 and 35 and it will be noted that the bushing members are slightly longer than the thickness of these lower end portions 36 and 37 to obviate binding and to permit the oiler assembly to be freely rotated. The upper end portions 38 and 39 of the mounting brackets are slightly angulated with respect to the lower portions to be directed away from the opposite ends of the oiler assembly 10 and these portions are apertured as at 40 and 41 to receive or be connected to the lower ends of the chain members 16 and 17.

The bolts 25 and 26 together with the elongate rod 29 form mounting means which extend beyond the opposite ends of the oiler to permit the oiler to be rotatably supported by the brackets 18 and 19 and this means also serves to interconnect the discs 20 and 21 and maintain them in proper relation to close the opposite ends of the cylindrical body 19'. Additionally, this means is utilized to mount a plurality of baffle plate members 42 within the interior of the body 19' and in this respect it will be noted that each baffle plate is to be rigidly mounted on the elongate rod 29 in properly spaced relation within the interior of the body 19' to prevent surge of liquid chemical within the oiler as the same may be moved when in use.

As will be seen most clearly in FIG. 3, each baffle plate or disc 42 has the major circumferential extent thereof formed so as to closely conform with the inner surface of the body 19' to prevent flow of liquid, whereas a small portion of each baffle plate or disc is cut away as indicated by the reference character 43 to provide a small passageway 44 through which the liquid chemical may pass to seek its own level within the confines of the body 19'. At the same time it will be appreciated that the passageways 44 are small enough to prevent undue surge or splashing of the liquid within the body.

The cut-away portions 43 of the baffle plates are disposed in substantially diametrically opposite relation to an opening means in the form of a plurality of elongated longitudinally extending openings or slots 45 formed in the uppermost portion of the body means. As illustrated herein, openings 45 are shown as being three in number, although it is apparent that any number of such openings can be employed as desired, and in addition it should be noted that each of baffle members 42 is preferably disposed intermediate the ends of adjacent openings as seen most clearly in FIG. 1.

Wrapped around the exterior surface of the body 19' is a sheet of absorbent material 51 which may be felt or the like, and which is of sufficient width that it has opposite longitudinal edge portions 52 and 53 which project from the body 19' in the manner shown most clearly in FIG. 3 and to maintain the sheet 51 in place there is provided a covering of expanded metal 54 which also has opposite longitudinal edge portions 55 and 56 which overlie at least in part the edge portions 52 and 53 of the sheet 51. A pair of elongated straps 46 and 47 formed of rigid material, such as iron or the like, is disposed along the outer surface of the foraminous material adjacent the opposite edge portions 55 and 56. A plurality of fastening elements, such as bolts 57 are received through suitable aligned openings provided in straps 46 and 47, and the foraminous and absorbent materials, nuts 58 being provided on each of the bolts 57 to clamp the edge portions of the foraminous material against the edge portions 52 and 53 of the sheet to maintain the absorbent sheet in close contact with the outer surface of the body 19'. The fasteners 57 also serve to sandwich the absorbent means 18' between the edge portions 52 and 53 of the absorbent sheet 51 such that the absorbent means is in close physical contact with the absorbent sheet whereby to effectively transfer the liquid chemical therebetween.

It is to be appreciated that the nuts 58 on the bolts 57 are not to be drawn so tight as to pinch the absorbent sheet 51 and the absorbent means 18' so tightly that they will be ineffective to contain a great deal of liquid chemical and for this reason the showing of FIG. 3 is slightly exaggerated to illustrate that the bolts 57 only loosely engage the parts together but at the same time it is to be pointed out that it is desirable to maintain a good physical contact between the edge portions 52 and 53 and the absorbent means 18'.

In the form of the invention shown in FIGS. 1–3, the absorbent means 18' takes the form of an elongate sheet of material such as burlap, untreated canvas or the like, which will readily absorb the liquid chemical. The sheet is folded such that it forms two layers 59 and 60 with the free longitudinal edges 61 and 62 disposed between the edge portions of the absorbent sheet 51 and with the lower portion looped as at 63 to hang freely from the body 19'. A flexible weight means indicated generally by the reference character 64 and which preferably takes the form of a length of chain is located within the pocket formed by the loop 63. Chain 64 is supported in position by a plurality of substantially vertically extending chains or flexible support members 65, each of chains 65 having the lower end thereof secured to chain 64 and having the upper end thereof secured to one of the bolts 57. In this manner, the chain 64 is suitably suspended in position thereby causing the absorbent means 18' to closely conform to the contour of an animal's body as it passes thereunderneath, and yet eliminating any strain on the absorbent means such that the absorbent means is not required to support the weight of the chain 64.

An important novel feature of the present invention is the manner in which the flow of liquid chemical through the openings 45 is controlled. This is accomplished by the present invention by providing an intermediate looped portion 66 of the absorbent layer 51 which projects through the openings and downwardly within the interior of the body means. It is apparent that the parts of portion 66 adjacent the openings are disposed in close proximity to one another in order to effectively meter the flow of liquid chemical through the openings, and in addition it is evident that the looped portion 66 will serve somewhat as a wick in order to provide effective saturation of the absorbent layer at all times.

It will be appreciated that the oiler assembly 10 is disposed at an elevation above the ground whereby an animal passing therebeneath will cause its back to engage the expanded metal 54 covering the oiler body. The expanded metal has a rough surface which provides the necessary rubbing and scratching effect to keep the cattle satisfied, and at the same time this causes the body 19' to rotate partially so that the normally uppermost discharge openings 45 will be rotated into position to permit the liquid chemical within the body means to flow therethrough and further saturate the absorbent layer 51. Due to the good physical contact between the free edge portions 61 and 62 of the absorbent means 18' and the layer 51, the absorbent means will likewise be constantly maintained in a substantially saturated condition so as to effectively apply the liquid chemical to the hide of the animals as they pass therebeneath. It is also apparent that the spacing of the various wiping means 18' is such that they will operate independently of one another so as to service several cattle at a time.

Referring now to FIG. 4 of the drawing, a modification is illustrated wherein an absorbent layer 70 of material similar to layer 51 of the device shown in FIG. 3 is provided with a looped intermediate portion 71 which projects through opening 45 of the body means and extends within the interior thereof. The lower end portions 72 and 73 of absorbent layer 70 depend a substantial distance below the lower portion of the body means, and metal strips or bars 75 are disposed on opposite sides of the depending lower end portions 72 and 73 for clamping the absorbent material in tight engagement. Bolts 76 extend through aligned openings in the clamping strips 75 and nuts 78 are threaded on the outer ends of the bolts for firmly clamping the assembly together. It is evident that in this manner the lower end portions of the absorbent material are firmly held together, and the absorbent material is maintained in operative position with respect to the body means. In addition, the bars 75 serve as weights to cause the container to return to normal position after it has been tilted by an animal passing therebeneath.

Referring now to FIG. 5, a further modification is illustrated wherein absorbent layer 80 is provided with an intermediate looped portion 81 projecting within the interior of the body means to operate in a manner similar to looped intermediate portions 66 and 71 of the previously described modifications. In contrast to the arrangement of the device shown in FIG. 4 wherein the absorbent layer substantially surrounds the body means, layer 80 of the modification shown in FIG. 5 surrounds approximately one half the outer surface of the body means and the lower wiping portions 82 and 83 thereof depend from substantially diametrically opposite portions of the body means. A spacer strip 85 extends between portions 82 and 83 and is secured to these portions at opposite ends thereof by means of bolt assemblies 86 and 87 which pass through the upwardly extending flanges 88 provided at opposite ends of the spacer strip. Strip 85 serves not only to maintain wiping portions 82 and 83 in spaced relationship to one another, but also serves to maintain the absorbent layer in proper operative position relative to the body means as does the spacer assembly of the modification shown in FIGS. 3 and 4.

Referring now to FIGS. 6–8 of the drawings, a further modification is illustrated wherein the over-all arrangement is similar to that shown in FIGS. 2 and 3, and corresponding parts have been given the same reference numerals prefixed by a "1," or in other words, the component illustrated by figure 18' in FIGS. 2 and 3 is illustrated by numeral 118' in FIGS. 6–8. It is apparent that the manner of mounting the disc members at the opposite ends of the tubular body and the mounting bracket members is identical in the modification shown in FIGS. 6–8 with that shown in FIGS. 1–3 as well as the arrangement of the absorbent material and the expanded metal about the exterior of the cylindrical member.

The construction as shown in FIGS. 6–8 differs from that shown in FIGS. 1–3 in that the baffle members have been eliminated, and the arrangement of the longitudinally extending openings or slots 145 in this further modification is altered. In contrast to the arrangement shown in FIGS. 1–3 wherein the elongated slots are each positioned at the uppermost portion of the tubular body, the slots in the modification shown in FIGS. 6–8 are offset from the uppermost portion, and alternate ones of the slots are offset preferably an angle of 30° with respect to the vertical alternately on opposite sides on the uppermost portion of the tubular body member.

This arrangement may be most easily seen with reference to FIGS. 7 and 8 of the drawings illustrating two adjacent slots formed in the tubular body. As seen in FIGS. 7 and 8, each of the slots 145 is displaced 30° from the vertical center line of the circular member such that an included angle of 60° is defined between the various slots formed therein.

It is evident that the loop portion 166 of the absorbent layer 151 serves to control the flow of liquid chemical through the openings 145, and additionally serves as an effective wick for maintaining the absorbent material in a moist condition. The disposition of the slots 145 offset from the uppermost portion enables the liquid chemical to flow outwardly through openings 145 on either side of the tubular body with less movement than is required in the apparatus shown in FIGS. 1–3. It is evident that the angular disposition of the openings 145 with respect to the vertical center line of the tubular body will depend upon the anticipated amount of rotation of the tubular body produced upon movement of cattle or the like beneath the invention apparatus. It is apparent that the angle may be other than 30° dependent upon the particular operating conditions, although the angle illustrated is considered preferable in most instances. The operation of the device as shown in FIGS. 6–8 is apparent when considered in connection with the previously described mode of operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In a cattle oiler comprising a tubular body member having closure means at its opposite ends and receiving treating fluid therein, at least one opening formed through said body member, flexible means connected to said body member for rotatably suspending said body member in a substantially horizontal position with said opening normally disposed in the upper portion thereof and permitting an animal to lift, tilt and rotate the oiler freely, a layer of absorbent material disposed about said body member and having opposite edge surfaces, said layer including an intermediate portion extending through said opening into the interior of said body member for controlling the flow of treating fluid through said opening upon tilting movement of the body member.

2. Apparatus as defined in claim 1 wherein said opposite edge surfaces extend downwardly below the body member.

3. In a cattle oiler comprising a tubular body member having closure means at its opposite ends and receiving treating fluid therein, a substantially longitudinally extending elongate opening formed through said body member, means connected to said body member for rotatably suspending the body member in a substantially horizontal position with said elongate opening normally disposed in the upper portion thereof, a layer of absorbent material disposed about and covering said body member, said layer including an intermediate portion extending through said elongate opening into the interior of said body member for controlling flow of treating fluid through said elongate opening upon tilting movement of the body member, and a sheet of absorbent material contacting said layer of absorbent material and edge connected longitudinally of and depending from said body member along a line substantially diametrically opposed to said elongate opening.

4. A cattle oiler as defined in claim 3 wherein said sheet of absorbent material is of double thickness and looped to define a free longitudinal edge, a flexible weight member disposed between the layers along said free edge, said weight member being supported by at least a pair of upwardly extending flexible members connected with and adjacent to opposite end portions of said weight member.

5. Apparatus as defined in claim 3 including a sheet of foraminous metallic material disposed in surrounding relationship to said layer of absorbent material for maintaining said absorbent material in place upon the body member.

6. A cattle oiler comprising a closed hollow substantially cylindrical body for receiving treating fluid therein, a plurality of spaced longitudinally extending elongate openings formed through the wall of said body, means connected with and adjacent to opposite end portions of the body for rotatably suspending the body in a substantially horizontal position with said openings disposed in the upper portion thereof, a plurality of layers of absorbent material disposed about said body member, each of said layers including an intermediate portion extending through one of said openings into the interior of said body for controlling flow of treating fluid through said openings upon tilting movement of the body.

7. Apparatus as defined in claim 6 wherein each of said layers includes opposite edge portions extending downwardly below said body.

8. Apparatus as defined in claim 6 wherein portions of each of said layers extend down below said body, and including fastening means for maintaining said layers in operative position relative to said body.

9. Apparatus as defined in claim 6 wherein said spaced openings are in alignment longitudinally of the body and said body includes baffle means disposed within said body intermediate the openings and the lateral edges of adjacent layers for controlling the flow of treating fluid within said body.

10. In a cattle oiler comprising a closed tubular body member for receiving treating fluid therein, longitudinally extending elongate opening means formed through the wall of said body member, means connected to said body member for rotatably suspending the body member in a substantially horizontal position with said opening means normally above the horizontal radial plane of the body member, a layer of absorbent material disposed about and in engagement with the outer surface of said body member, said absorbent layer projecting through said opening means and having a looped intermediate portion thereof disposed within said body member for controlling the flow of fluid through said opening means upon tilting movement of the body member, and a sheet of foraminous metallic material disposed about and in engagement with the outer surface of said absorbent layer.

11. Apparatus as defined in claim 10 wherein the opposite edges of said sheet of foraminous material are secured by fastening means, and absorbent means depending from said body and secured between said opposite edges of the foraminous material in contact with said layer of absorbent material.

12. Apparatus as defined in claim 11 wherein said absorbent means is of double thickness and looped to define a free longitudinal edge, there being a flexible weight member disposed between the layers along said free edge.

13. A cattle oiler comprising an elongate substantially cylindrical hollow closed container having longitudinally extending opening means formed through the wall thereof, said container being adapted to receive treating fluid therein, means connected to said container for rotatably suspending the container in position such that said opening means is normally disposed uppermost and yet permitting the container to move into position to allow fluid to flow out through said opening means, a sheet of absorbent material disposed about the outer surface of said container and having free portions extending downwardly along the underportion of the container and constituting flexible wiping means, said absorbent layer including an intermediate portion projecting through said opening means and defining a loop extending within said container, and spacer means mounted between upper portions of the wiping means for holding the wiping means in spaced relation to each other.

14. Apparatus as defined in claim 13 wherein said spacer means are maintained in operative position relative to said layer of absorbent material by fastening means which serve to additionally maintain the absorbent layer in proper position relative to the container.

15. A cattle oiler comprising an elongated closed hollow substantially cylindrical body member having longitudinally extending opening means formed therethrough, means connected to said body member for rotatably suspending the body member in a substantially horizontal position with said opening means normally disposed uppermost, a layer of absorbent material disposed about said body member, said layer having an intermediate portion extending through said opening means and disposed within said body member, said layer also including opposite end portions depending from said body member and extending therebelow to provide wiping means, and connector means secured between said opposite end portions for maintaining the layer of absorbent material in proper operative position.

16. Apparatus as defined in claim 15 wherein said connector means comprises an elongate member having a length substantially equal to the diameter of said body member.

17. In a cattle oiler comprising a tubular body member having closure means at its opposite ends and receiving treating fluid therein, flexible means connected to said body member for rotatably suspending said body member in a substantially horizontal position, said tubular member having a vertical center line defined thereby when in its normal suspended horizontal position, at least one opening formed through said body member and offset with respect to said vertical center line, a layer of absorbent material disposed about said body member and having opposite edge surfaces, said layer including an intermediate portion extending through said opening into the interior of said body member for controlling the flow of treating fluid through said opening upon tilting movement of the body member.

18. In a cattle oiler comprising a tubular body member having closure means at its opposite ends and receiving treating fluid therein, flexible means connected to said body member for rotatably suspending said body member in a substantially horizontal position and permitting an animal to lift, tilt and rotate the oiler freely, said body member having a vertical center line when suspended in its normal horizontal position, a plurality of longitudinally extending slots formed in said body member, said slots being spaced from one another, alternate ones of said slots being offset on alternately opposite sides of said vertical center line, and a plurality of layers of absorbent material disposed about said body member, each of said layers of absorbent material having opposite edge surfaces and including an intermediate portion extending through an associated slot into the interior of said body member for controlling the flow of treating fluid through the slots upon tilting movement of the body member.

19. Apparatus as defined in claim 18 wherein each of said slots is offset approximately 30° from the vertical center line of the body member.

20. A cattle oiler comprising a closed hollow substantially cylindrical body for receiving treating fluid therein, a plurality of longitudinally extending slots in spaced aligned relation formed through the wall of said body, means connected with and adjacent to opposite end portions of the body for rotatably suspending the body in a substantially horizontal position with said slots disposed in the upper portion thereof, a plurality of layers of absorbent material disposed about said body member and each of said layers including an intermediate looped portion passing through a slot into the interior of the body and depending within the body through the major portion of the diameter of the body, for controlling flow of treating fluid through the slots upon tilting movement of the body.

21. The invention according to claim 20 with absorbent means joined to each of said layers and depending therefrom and from the lowermost side of the body for conducting treating fluid downwardly from the body.

22. The invention according to claim 20, wherein said plurality of slots are positioned to lie alternately in the longitudinal direction of the body on opposite sides of a vertical longitudinal plane passing radially of the body.

23. The invention according to claim 20 with a plurality of baffles disposed within and transversely of the cylindrical body between adjacent ends of the slots and partitioning the interior of the body through the major portion of the diameter thereof from the uppermost part thereof and short of the opposite lowermost part whereby means is provided for the passage of treating fluid lengthwise of the body.

References Cited in the file of this patent

UNITED STATES PATENTS

| | | |
|---|---|---|
| 987,433 | Crawford | Mar. 21, 1911 |
| 1,471,109 | Dick | Oct. 16, 1923 |
| 1,999,122 | Clark et al. | Apr. 23, 1935 |
| 2,814,272 | Worden | Nov. 26, 1957 |